April 10, 1956  R. R. EDGAR  2,741,373
LOGGERS COMBINE

Filed April 27, 1953  5 Sheets-Sheet 1

Inventor:
Robert R. Edgar
By: Soans, Glaister & Anderson
Attys

April 10, 1956 R. R. EDGAR 2,741,373
LOGGERS COMBINE
Filed April 27, 1953 5 Sheets-Sheet 3

Inventor:
Robert R. Edgar
By: Soans, Glaister & Anderson Attys.

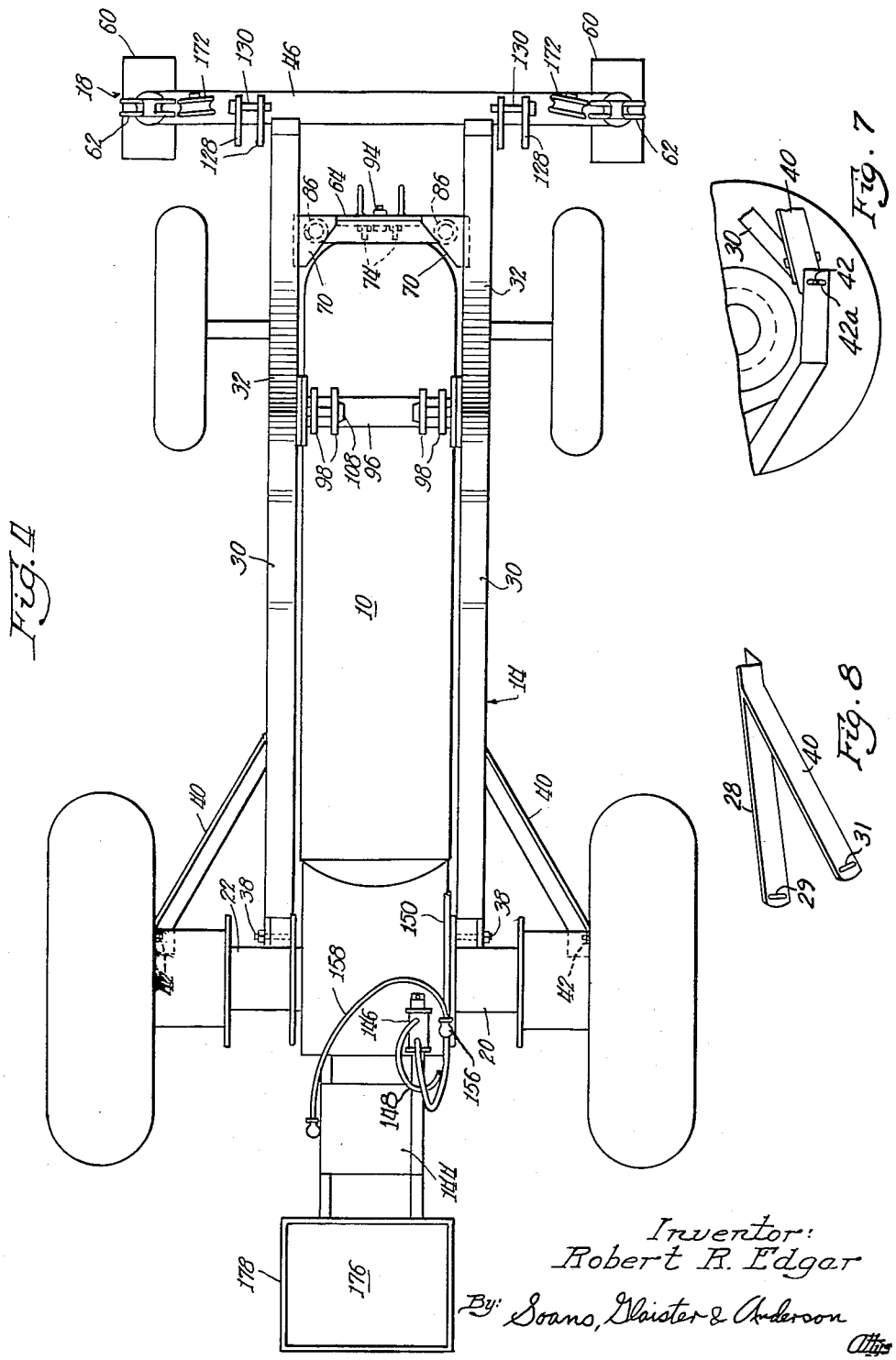

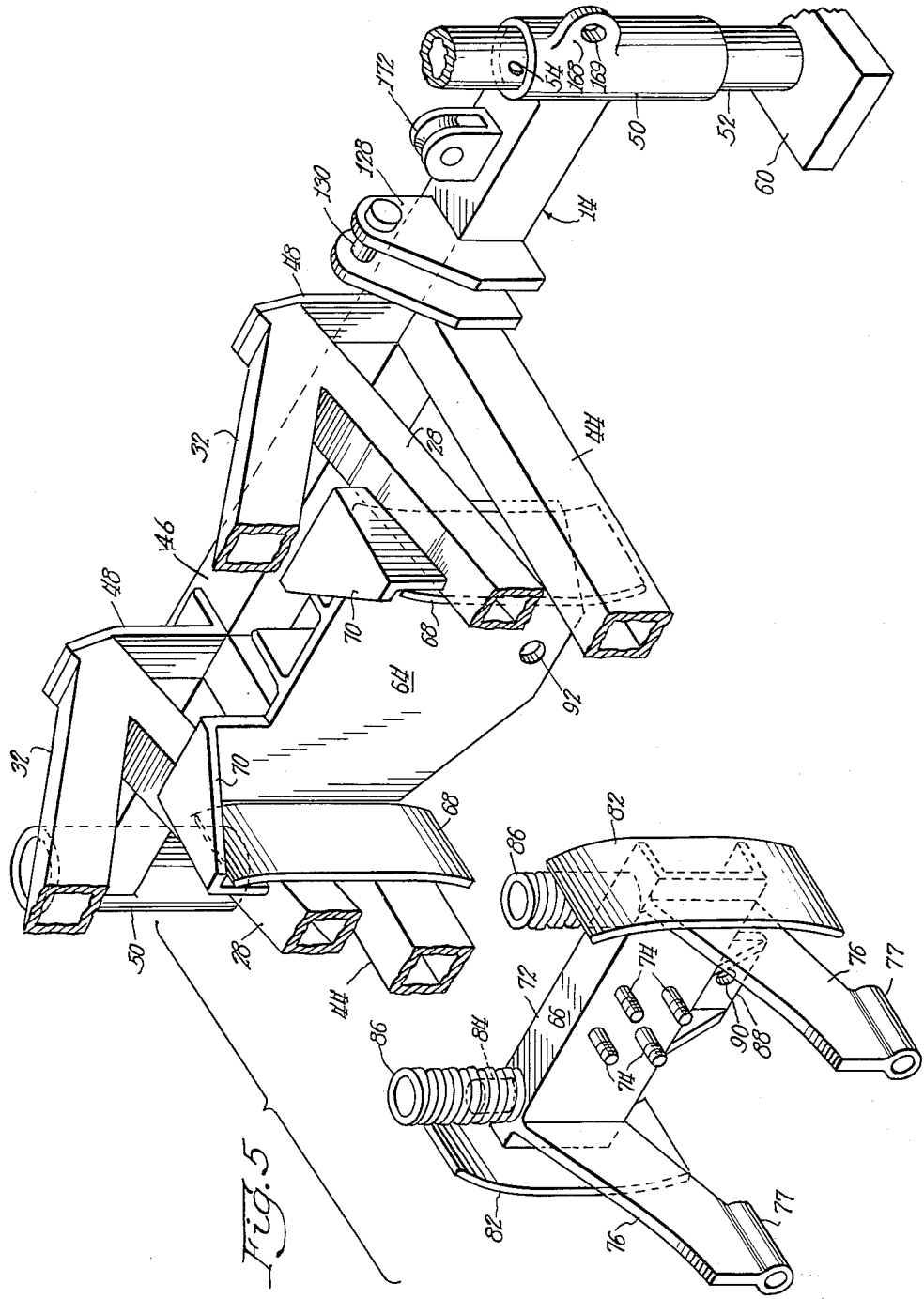

United States Patent Office 2,741,373
Patented Apr. 10, 1956

2,741,373
LOGGERS COMBINE

Robert R. Edgar, Marquette, Mich., assignor to Kimberly-Clark Corporation, Neenah, Wis., a corporation of Delaware Application April 27, 1953, Serial No. 351,321

5 Claims. (Cl. 212—145)

The present invention relates generally to log handling apparatus, and is more particularly directed to a mobile unit adapted for use in the gathering or yarding of cut timber and the loading of the logs upon a truck or the like for transporting to the point of use.

Logging is fundamentally a problem of transportation and, consequently, adequate control of transportation charges is of the greatest importance to the success of such operation. The expense of moving the logs from the various points of assemblage, known as landings, to the site of the manufacturing operation can be fairly well determined in advance, since it involves using trucks or railroads over well-known routes having fixed distances. However, it is not so easy to determine, in advance, the time and labor which it will be necessary to expend to yard the logs from the scattered stumps to the landings. Many variable factors, such as the topography of the areas to be worked, the stand of available timber suitable for cutting, the condition and location of the side roads or skidways leading to the landings, and the type of equipment which can be used for the yarding operation, enter into the determination of the economics of a proposed cut of timber. Consequently, the ability to select the most economical method for assembling the logs, under any given set of circumstances, often makes the difference between a successful and an unsuccessful logging operation.

Generally, the three known means for yarding are horses, cable-hauling systems, and tractors or trucks. The mobility of tractors with heavy loads over all kinds of terrain and ground conditions gives them certain advantages over the other means. However, in many instances it is decidedly more advantageous to employ a cable-hauling system for yarding. Thus, there is no single solution to the problem of yarding most economically, insofar as the system employed is concerned, and provision must be made for meeting each problem as it arises.

The logging of pulpwood, for example, frequently involves the yarding of relatively small, widely scattered logs which may lie in very rough and rocky terrain with either no skidways or skidways that are quite narrow and incapable of handling bulky log-moving equipment. The use of the ordinary cable-hauling methods is also out of the question in such instances because of the time consuming erection of these systems and their limited scope of operation from a given set up. As a result, much of the work is done with inadequate equipment and involves considerable manhandling of the logs by the loggers. Usually, such yarding in small timber is done by neighboring farmers during the fall and winter with the aid of whatever adaptable farm equipment they might possess. The present invention is directed particularly toward a practical solution of the logging problem just presented.

The primary object of this invention is to provide an improved low cost, mobile apparatus which is capable of use in both the yarding and loading of logs. Another object is to provide improved apparatus adaptable for use in either skidding or cable-hauling methods of yarding, as well as for loading logs, which is readily mounted on and removed from a mobile supporting unit. It is also an object of the present invention to provide an improved yarding and loading attachment for a mobile supporting unit, including elements positionable to relieve the supporting unit of a large portion of the operating and shock loads developed during use of the attachment.

A further object of this invention is to provide apparatus of the type described which includes a movable hoisting element operable through a hydraulic system having an overload relief device which is effective to lower gradually and safely the hoisting element when the latter is overloaded. Another and even more specific object of this invention is to provide a combined yarding and loading attachment for mounting on a mobile unit, such as a tractor, which includes attaching means arranged to provide for movement between the attachment and the unit in a manner which prevents the transmittal of lateral shock forces imposed on the attachment to the supporting unit. Additional objects are to provide equipment of the type described which is compact in arrangement, economical to construct, and operable through power existing on the mobile supporting unit. Other objects and advantages will be readily apparent as the disclosure progresses with reference to the accompanying drawings, wherein:

Figure 4 is an enlarged top plan view of the structure in Figure 2, with the boom removed in order to more clearly show the supporting frame structure.

Figure 5 is an enlarged exploded view, in perspective, of the front end portion of the boom-supporting frame structure in the preceding figures.

Figure 6 is a front end view of the structure, with portions broken away and in section to clarify the arrangement of certain of the elements, illustrating the use of the outriggers on uneven ground.

Figure 7 is an enlarged, fragmentary view of Figure 2.

Figure 8 is an enlarged, fragmentary view of a modified form of supporting frame structure for the boom, shown in perspective.

Figure 1:
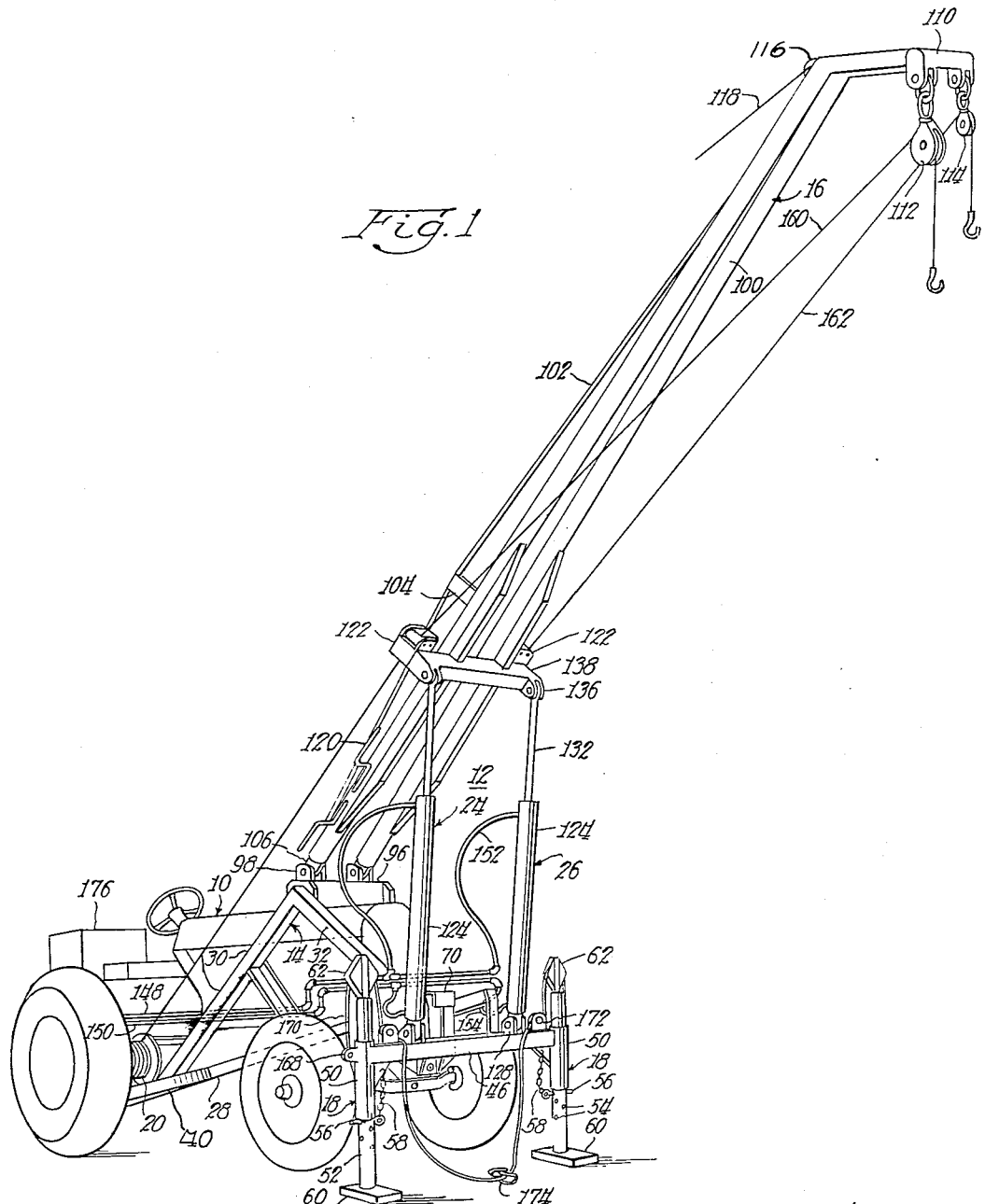
Figure 1 is a perspective view of apparatus embodying the present invention, shown in operating position.

Referring to the drawings, it is seen that the illustrated embodiment of the invention includes a tractor 10 supporting a detachably mounted yarding and loading apparatus 12. Broadly, the attachment 12 comprises a frame structure 14, a boom 16 pivotally mounted on the frame structure for vertical movement relative thereto, and a pair of outrigger members 18 which are movable to and from a ground-engaging position. A pair of power driven winches 20 and 22 (Figs. 1 and 4) and a pair of hydraulic rams 24 and 26, all of which receive power from the tractor, cooperate with the movable boom to provide a logging device which is usable either from a stationary position or while the unit is in motion.

Figure 2:
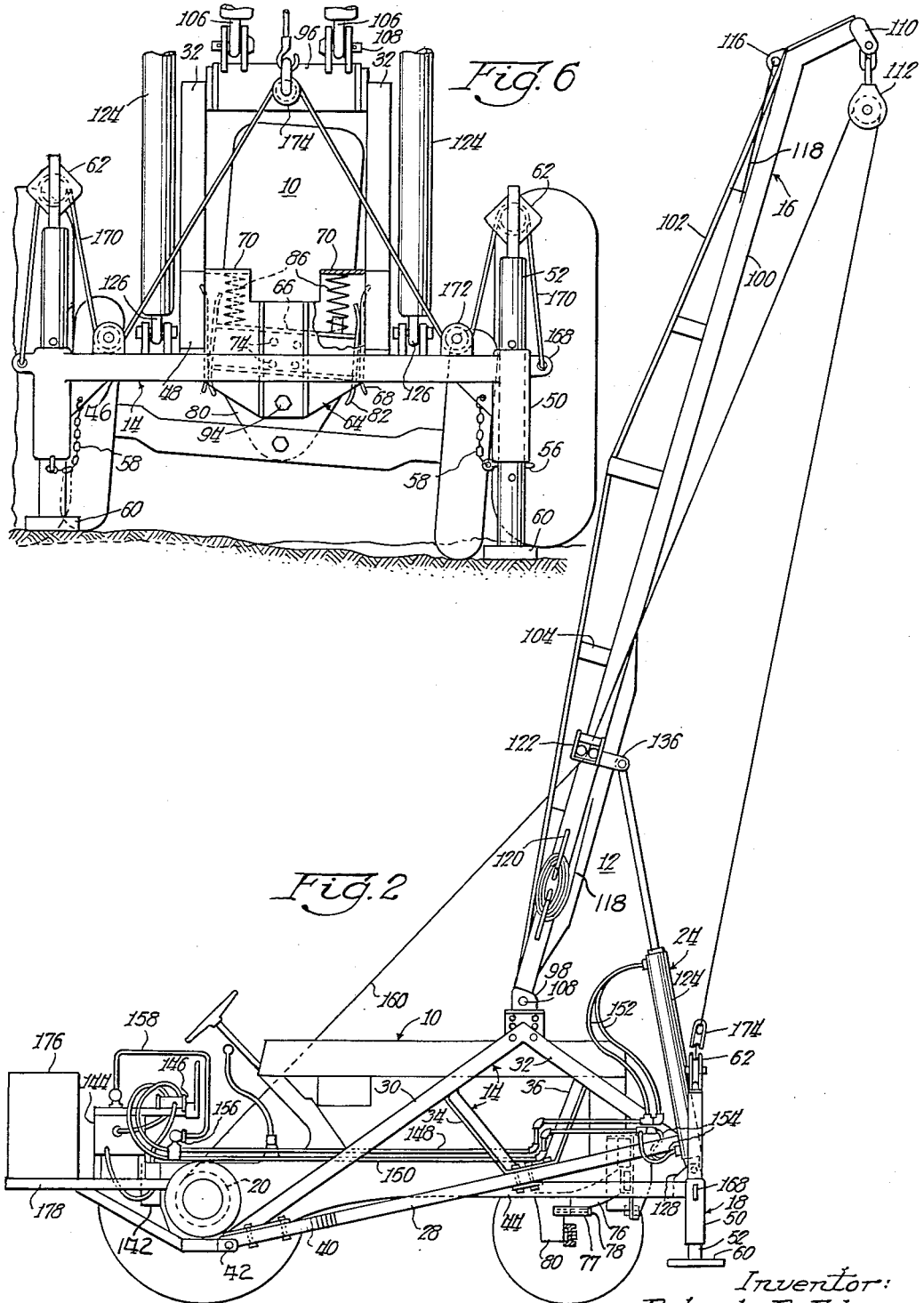
Figure 2 is a side elevational view of the apparatus in transport position.

As seen best in Figures 2 and 4, the frame 14 is essentially a U-shaped structure having a pair of spaced-apart longitudinal members 28 united at one end in a manner affording entry of the forward portion of the tractor 10 between the side members 28. Each of the longitudinal members 28 serves as a base member for a vertically extending truss comprising diagonal members 30 and 32 and a pair of integrally formed brace members 34 and 36. The various frame members are preferably structural steel members which are bolted together, although they might be welded together.

The rear end portions of the longitudinal frame members 28 include aligned transverse openings therethrough (not shown) which are alignable with a pair of threaded bores in a portion of the tractor rear axle housing intermediate the ends thereof for connection of the frame 14 to the tractor by means of a pair of bolts 38 (Fig. 4). Additional bracing is afforded the rear of the tractor-attached frame structure through the use of a pair of diagonal members 40 which extend laterally from an intermediate portion of each of the frame members 28 to a bolted connection 42 with an outer-end portion of the tractor, such as the supporting structure for the winches 20 and 22. With respect to the connection afforded by the bolts 38 and 42, it is desirable that such connections afford relative movements of the frame 14 with respect to the tractor about the axis of the front pivot 94. Accordingly, the bolt receiving openings in the frame members 28 and 40, or in the tractor, or both, are enlarged to provide sufficient play in these connections to provide the aforementioned pivotal movement. In this respect, Figure 7 illustrates the use of elongated bolt receiving openings in tractor mounted brackets to which frame members 28 and 40 are connected. The elongated opening 42a receives the bolt 42 and a similar opening (not shown) receives the bolt 38 (Figure 4). In Figure 8 there is shown a modified form wherein the members 28 and 40 are provided with elongated openings 29 and 31, respectively.

As noted particularly in Figure 2, the outriggers 18 are mounted on the forward portions of the longitudinal frame members 28 by means of a sub-frame comprising a pair of members 44, fixed to an intermediate portion of the main frame members 28 and extending forwardly in underlying relation to the members 28, and a transverse member 46 (Fig. 3) which is fixed, as by welding, to the forward ends of the members 44 in laterally extending relation thereto. The transverse member 46, which is thereby disposed in vertically spaced relation to the ends of the longitudinal frame members 28, is secured to the latter by a pair of angle forming brackets 48 (Figure 5) which are welded or otherwise suitably connected to the forward ends of the main frame members 28 and the transverse member 46. The opposite ends of the transverse member 46 mount the pair of leg members or outriggers 18, each comprising a hollow cylindrical part 50 fixed to the member 46 in a generally vertically extending position, and an elongated tubular member 52 disposed within the cylindrical part 50 and having a sliding fit with the bore thereof.

The tubular member 52 includes a series of aligned pairs of transverse openings 54 (Fig. 1) disposed in spaced relation along the length of the tube to provide means for selectively maintaining the position of the latter with respect to the cylindrical part 50 by insertion of a pin 56 through one of the pairs of aligned openings 54.

A chain 58 or the like may be utilized to secure the pin 56 with respect to the frame structure to prevent its loss. The lower end of each of the tubular members 52 has a horizontal plate member 60 fixed thereto to provide a load-bearing platform for the outrigger. The upper end of each outrigger mounts a pulley block 62 adapted to have the groove of its sheave extend in the direction of the transverse frame member 46. Further details in this respect will be given later on in the description.

The frame structure 14 is secured to the front end of the tractor for pivotal movement about the longitudinal axis of the tractor, through means including a transverse vertical plate structure 65 (Fig. 5) fixed in bracing relation between the forward portions of the spaced side frame members 28, and a mounting bracket 66 which is preferably detachably secured to the front end of the tractor 10. The transverse plate structure 64 has opposite side edges thereof fixed to the inner faces of the side frame members 28 and 44, and is additionally braced with respect to these members by a pair of curved plates 68, disposed generally at right angles to the plate 64 and extending rearwardly therefrom in fixed relation to the members 28 and 44, and by a pair of corner braces 70 extending horizontally across the corner formed by the plate 64 and each of the side plates 68.

Figure 3:
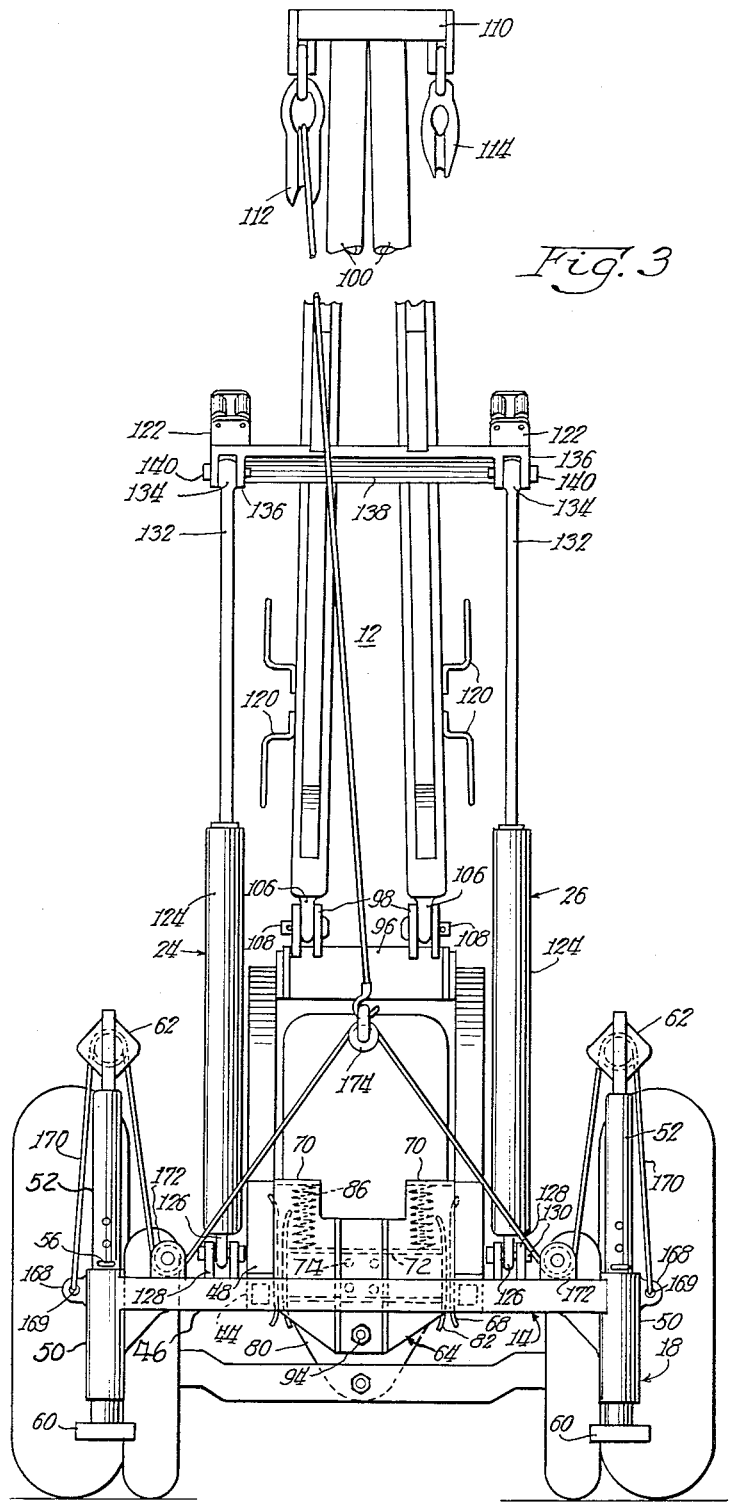
Figure 3 is an enlarged front end view of the structure in Figure 2, with portions of the structure broken away.

The detachable mounting bracket 66 comprises a forwardly facing channel member 72 having four locating studs 74 secured to its web portion in rearwardly extending relation for insertion in correspondingly spaced openings (not shown) in the forward end of the tractor (Figs. 3 and 6). A pair of rearwardly extending, spaced-apart members 76 are also fixed to the web of the channel member 72 to provide additional bracing for the structure. The free end portion of each of these brace members includes a cylindrical bearing portion 77 for receiving bolt 78 (Fig. 2) or the like which also extends through a suitable bore in the tractor steering housing 80 to secure the mounting bracket 66 to the tractor. If desired, of course, the mounting bracket 66 may be permanently fixed, as by welding, to the tractor.

Opposite end portions of the channel 72 have fixed thereto, as by welding, a pair of vertically extending bearing plates 82 (Fig. 5) which are preferably curved inwardly at their upper and lower end portions to provide a rocker-like plate. Inwardly of each of the bearing plates 82, in vertically extending relation to the upper flange of the channel member 72, there is fixed a spring locating element 84 for mounting a coil spring 86 in fixed position on the channel. Depending from the mid-portion of the channel member 72 is a transverse plate 88 having an opening 90 therethrough which is alignable with a similar opening 92 through the transverse plate 64 of the attachment frame for securing the latter in pivotal relation to the tractor mounting bracket 66 by a pivot bolt 94 (Fig. 4). The tractor-attached bracket 66 is adapted for disposition on the tractor so that the pivot bolt 94 lies in the plane of the longitudinal axes of the tractor and the attachment frame (Fig. 3), thereby insuring equal distribution of the load of the attached apparatus laterally of the tractor.

Having fixed the mounting bracket 66 on the front end of the tractor, the frame structure 14 is positioned so that the side plates 68 are disposed on the outer sides of and in adjacent, generally coextensive relation to the plates 82 of the bracket 66, with the coil springs 86 slightly compressed between the channel member 72 and the horizontal plate portion of the corner braces 70 for the attached frame structure. The bearing plates 68 and 82 are preferably spaced apart an amount sufficient to permit relative movement therebetween throughout a predetermined angle of rotation about the pivot bolt 94. Relative rotation of the tractor 10 and the frame structure 14 in excess of such predetermined angle, about their common longitudinal axis, will cause the plates 68 and 82 to bear against each other in resistance to further relative movement.

Normally, however, relative lateral movement of the frame 14 with respect to the tractor 10 during motion of the latter is yieldingly resisted by the pair of coil springs 86. These springs are preferably made sufficiently strong to maintain their resiliency under all expected loads in order to avoid the direct or shock transmission or torsional or lateral forces from the boom 16 to the front end, and thereby to the main frame, of the tractor.

It is seen, therefore, that the connection just described affords a limited relative movement between the tractor 10 and the attached frame structure 14. Other types of connection affording the same general result may well be substituted.

Intermediate the intersections of the truss members 30 and 32 on opposite sides of the frame structure 14 there is bolted, or otherwise suitably secured, a transverse member 96 (Figs. 1 and 4) affording a lateral brace for the frame and a mounting platform for the boom 16. This transverse member 96 has fixed to its upper surface two pairs of spaced-apart lugs 98 having aligned openings therethrough defining a transverse horizontal axis for the pivotal mounting of the lower end of the boom 16.

In the illustrated form, the boom 16 is a type of simple truss comprising a pair of converging tubular members 100 (Fig. 1) each of which is longitudinally reinforced by an overlying tie member 102 held in arched relation to the main load bearing member 100 by a plurality of braces 104. The lower end of each of the members 100 includes a loop forming part 106 (Fig. 3) positionable in one of the pair of spaced lugs 98 for insertion of a pin 108 to thereby provide for pivotal movement of the boom about the axis of the aligned openings through the lugs 98 and the loops 106.

The upper end of the boom 16 is inclined forwardly with respect to the main portion of the boom and includes a short transverse member 110 for mounting a pair of pulley blocks 112 and 114. Also disposed adjacent the upper end of the boom in rearwardly extending relation thereto are a pair of ears 116 (Figs. 1 and 2) having openings therethrough providing for the attachment of guy wires 118 or the like which, when not in use, may be looped around a suitable bracket 120 (Fig. 3) adjacent the lower portion of each of the boom members 100. A fairleader 122 is disposed at an intermediate point along each of the boom members 100 in position for guiding a cable along the upper portion of the boom toward the pulley blocks 112 and 114.

Suitable power means is provided for effecting selective vertical movement of the boom 16, which in the illustrated embodiment comprises the pair of hydraulically operated rams 24 and 26 disposed between the transverse frame member 46 and an intermediate portion of the boom 16. The lower end of each of the ram cylinders 124 (Fig. 3) has a loop element 126 which is pivotally mounted on a bracket 128, fixed to the frame member 46, through the use of a bolt 130 inserted through aligned openings in the loop 126 and bracket 128. The free end of each of the ram piston rods 132 also includes a loop 134 which is pivotally attached to a mounting bracket 136, carried by a transverse member 138 on the under side of the boom, by a pivot bolt 140.

The hydraulic rams are preferably of the double-acting type, having a hose coupled to each of the opposite ends of the ram cylinder 124 (Fig. 1) for simultaneous supply and withdrawal of pressure fluid from opposite sides of the plunger or piston. Fluid pressure for the rams is provided by a system comprising a tractor mounted, engine-driven pump 142 (Fig. 2) including a supply tank 144 for accumulating pressure fluid, a suitable control valve 146 for regulating the flow of fluid between the pump and supply tank and the rams through a pair of conduits 148 and 150. One of the conduits 148 includes suitable coupling means at its forward end for a pair of flexible hoses 152 (Fig. 1) extending to the upper end of each of the ram cylinders 124. The other conduit 150 includes similar means for connection with the lower end of each of the cylinders through a pair of hoses 154.

A relief valve 156 is disposed in parallel relation to the conduit 150 in communication with the pressure fluid reservoir 144 (Fig. 4) through a conduit 158, and is operable when the pressure in the conduit exceeds a predetermined amount to effect the metered flow of pressure fluid back to the reservoir. This safety feature of the hydraulic system causes the boom to lower gradually and safely when subjected to an overload.

For handling a pair of cables 160 and 162 (Fig. 1) which are extended through the fairleaders 122 and the pulleys 112 and 114, respectively, on the end of the boom 16, there is provided the pair of tractor mounted winches 20 and 22. As illustrated in Figure 4, these winches are of a type which is mounted in coaxial relation to the rear axle of the tractor and are driven through suitable gear connections with driving means on the tractor. Separate controls (not shown) for each of the winches provide for independent operation thereof.

Referring to Figures 2 and 3, it is seen that the winch operated cables also enter into the adjustment of the previously described outriggers 18. Specifically, each of the cylinder parts 50 have fixed thereto a laterally extending lug 168 having an opening 169 therethrough affording an anchor means for an end of a cable 170 extending between the two outriggers. The cable 170 passes over the pulley 62 at the top of each outrigger and then downwardly beneath a pair of pulleys 172 having their blocks mounted on the transverse frame member 46 adjacent each of the outriggers. In the illustrated embodiment, the pulley blocks 62 and 172 are mounted for swiveling movement but might well be fixed in transversely aligned relation.

The portion of the cable 170 intermediate the pulleys 172 carries an additional pulley 174 providing means for the attachment of a hook or the like thereto. It will be seen, therefore, that the application of a tensile force on the center pulley 174 will operate to force the tubular members 52 downwardly with respect to the cylindrical part 50. Further, with the described arrangement the force on the pulley 174 is applied equally to the members 52 with the result that, regardless of the unevenness of the underlying support for the outriggers, the transverse frame member 46 will be maintained in a horizontal position, providing the rear wheels of the tractor are on fairly level ground and the tractor frame is generally horizontal. The tubular members 52 will be depressed until each has met resistance, through contact with the ground, and then the force on the pulley 174 will be applied equally to the members 52 to elevate the transverse frame member 46 while maintaining its generally level position. This is of particular importance since for the most efficient use of the described attachment it is required that the attachment frame be kept square with respect to the tractor rear axle. The combined effect of the three point suspension of the attachment on the tractor and the outriggers makes this possible.

There will be some situations in which the rear wheels of the tractor will not be on level ground or in which the boom 16 will not be quite vertical, due to the relative movement afforded between the frame 14 and the tractor about the pivot 94, or for some other reason. In such instances it is possible to level the framework, within the limits of movement permitted by the mounting, so that the boom 16 will be vertical. This can be accomplished with the mechanism shown by moving one of the outrigger members 52 to the desired extent and fixing it in position by placing pins 56 above and below the guide cylinder 50. The opposite outrigger member 52 can then be moved downwardly, through the application of a tensile force on the pulley 174, to level the boom and the member 52 then pinned in position.

A particularly simple, but somewhat less adaptable arrangement of outriggers, might consist of pivoted legs which are adjustable to any desired length, such as is shown in U. S. Patent 2,131,479, McGiffert et al. When the tractor reaches its approximate position for operation, these legs could be lowered to contact the ground and the tractor run up onto same under its own power, thereby elevating the front wheels and placing the load on the legs. Further, mechanical jacks of the screw type, as seen in Haniquet, U. S. Patent 2,258,383, could also be used as outriggers.

In order to offset the tractor-tipping effect of heavy loads on the boom when the latter is in its forwardly extending position, there is preferably provided a ballast 176, of any suitable form, carried by a platform 178 mounted on the rear of the tractor in rearwardly extending relation thereto.

Operation

Having in mind the foregoing description of the illustrated structure, it is believed that a detailed explanation of its operation and usages will further point out some of the advantages afforded by this invention.

The adaptability of the log handling attachment 12 to the ordinary agricultural and industrial types of tractors is believed readily apparent. With the provision of suitable, simple attaching means at the front of the tractor and on laterally spaced portions of the rear of the tractor the attachment 12 is easily connected to the tractor. The front mounting bracket 66 may be left on the tractor permanently, since it will not interfere with most other normal uses of the tractor, and as a result the mounting of the apparatus will involve only the positioning of the pivot bolt 94 at the front of the tractor and the bolts 38 and 42 connecting the frame to the rear axle housing.

For transport and during certain logging operations the outriggers 18 will be maintained in elevated relation to the ground, as by inserting the pin 56 above the cylindrical part 50 (Fig. 3). The angular position of the boom during transport of the apparatus will, of course, depend upon the obstacles anticipated en route, and the position of the boom may readily be altered while the tractor is in motion to avoid such obstacles.

With the outriggers in their elevated position, the apparatus might be used for lifting and loading through the combined use of the winches 20 and 22 and the hydraulic rams 24 and 26. In the usual loading operation one or both of the winch-operated cables 160 and 162 are used to elevate a load of logs, while the boom may be swung through its arc to center the load with respect to the vehicle being loaded. It will also be noted that the connection between the plate structure 64 and the mounting bracket 66 functions to snub the normal lateral forces created by swaying of the boom 16 to prevent their being transmitted as a shock load on the front end of the tractor.

For any extensive loading operation or in instances where heavier loads are to be handled, and, also, for yarding it is desirable to utilize the outriggers 18. The use of these outriggers not only enables the attachment 12 to handle greater loads, but also insures against twisting of the tractor frame under the strain of excessive lateral forces created on the attachment, which forces might otherwise be transmitted to the tractor.

To extend the outriggers to a ground engaging position, one of cables 160 or 162, is attached to the pulley 174 and the associated winch is operated to move the tubular members 52 downwardly with respect to the fixed cylindrical part 50. As indicated previously, the uniformly distributed force thereby applied to the two members 52 acts to move the latter downwardly at the same rate, once they have contacted the ground, to thereby maintain the transverse member 46 level. The outriggers are preferably extended until the entire load on the tractor front wheels is transferred to the outriggers. This can be determined by checking the amount of resistance to the turning of the tractor steering wheel. Preferably, the tractor is raised sufficiently to lift the front wheel support off the ground when loading. In certain instances, it may be desirable to allow a little slack between the attachment 12 and the front of the tractor and adjust the outriggers a sufficient amount to take up the slack and thereby place the load of the attachment 12 on the outriggers and leave the tractor front wheels on the ground to support the tractor.

With the increased area of distribution of the load, due to the forward and lateral positioning of the outriggers, the boom 16 is capable of handling a greater load without the danger of tipping or imposing any torsional strain on the tractor. Consequently, the relief valve 156 may be set to operate at a greater pressure than in the case of the use of the attachment without the outriggers.

In addition to the above described loading versatility of the subject apparatus, which makes it equally adaptable for economically loading a few logs as well as more extensive stationary loading operations, the described construction possess other features of definite advantage in loading. The compactness of the unit, particularly its short overall length, permits it to operate on small landings or in skidways where there is insufficient room to permit the presence of other types of mobile loaders, such as truck-mounted booms, together with the vehicle being loaded. Moreover, the ability of the tractor to move over difficult terrain permits it to load even in areas where the tractor mounted loader must operate from an off-the-road position in conjunction with a truck positioned on the road or skidway.

Of even greater importance than its loading ability is the adaptability of the described apparatus to various types of log gathering or yarding operations. This apparatus is capable of extending into areas of the most difficult terrain and skidding logs from remote positions out to the landing. This can be accomplished in certain instances by a simple cable hauling operation wherein one or both of the cables 160, 162 are payed out to the point of the fallen timber and then hauled into the tractor, with the outriggers preferably in use as the front support for the boom.

Or, if the tractor can get into the site of the cut log, the log may be ground skidded or snaked out to the landing. In such case the outriggers are left in their elevated position (Figures 2 and 3) and the log is secured to one or both of the cables and then pulled out by travelling movement of the tractor. The height of the boom permits the log to be skidded with its nose elevated, as in the case of skidding with bummers or high-wheel carts. This method of skidding is particularly advantageous in that it minimizes the destruction of young growth, provides a growth-stimulating scarifying action, and, also, avoids the excessive windrowing of slash which in many instances would necessitate a clean-up operation.

Another feature of the described embodiment of the present invention which combines with its extreme mobility to afford definite advantages, is its usefulness in cable-hauling methods of yarding. It is readily adaptable for high-lead yarding and can be quickly set up for operation at any selected site and just as readily moved to other sites. This feature makes the present apparatus particularly desirable for operations wherein cable-hauling is essential, due to swampy or exceedingly rough ground, but which is generally not economical because of the scattered location of the timber.

With the outriggers 18 in their load-bearing position and both cables payed out from the elevated boom 16 in the familiar pattern for high-lead yarding, efficient yarding of the scattered timbers can be achieved. In such instance, one of the cables 160, 162 constitutes the main line, the other cable is used as the haulback line, and the boom 16 serves as the head spar. The two cables are disposed along fixed paths in spaced-apart relation and then joined at their extremities to form a continuous looped circuit of cable which is selectively moved in opposite directions through operation of the tractor winches. Of course, the subject apparatus is also adaptable for use in other cable hauling systems, using one or more head spars and a haulback line.

The disclosed yarder is particularly adapted to gather in bundles or packages of wood which have been piled some distance from truck accessibility. The bundles are first yarded to the truck by cable, and then loaded onto the truck. This can be done by using lock-type chokers to keep the wood in a tight package, even though the packages may strike obstructions such as stumps, slash piles, rocks, etc., enroute to the yarder. Of course, as indicated above, the yarder is also adapted to yarding of tree lengths or logs, numbering one or more per trip, in the conventional manner.

In cable-hauling operations it is advantageous to utilize the guy wires 118 to stabilize the boom 16 and to assume certain of the forces thereon. It might be noted that guy wires may also be desired in connection with loading operations. In this event, it is preferred that the guy wires be taut with the boom at approximately 45° angle and slack off when the boom is raised. Preferably, the relief valve 156 is set to provide for a gradual lowering of the boom 16 to the guy wire supported position in the event that an excessive load is placed on the boom while in its raised position with the guy wires slack.

Apparatus constructed in accordance with the present invention provides an economical, compact unit which is adapted to many logging operations, and is of particular importance in marginal operations where the use of satisfactory power equipment was not practical heretofore. And, although described with respect to certain logging operations, it will be seen that this invention might well be utilized in connection with other logging operations as well as hoisting and hauling operations in connection with the handling of other materials.

Furthermore, in the description of a particular embodiment of this invention it is not intended to thereby limit the scope of the invention, since other modified forms may be readily constructed without departing from the principles of the invention.

I claim:

1. A combination log yarding and loading device comprising a wheeled supporting unit, a power-driven winch on said supporting unit, a source of hydraulic pressure on said supporting unit, a frame structure detachably mounted on said unit, said frame structure comprising a transverse member pivotally mounted at its midportion on one end of said supporting unit for movement about an axis parallel to the longitudinal axis of said unit, means on said unit for yieldingly limiting the pivotal movement of said transverse member relative to said unit, a pair of spaced apart members fixed to said transverse member and extending therefrom along the sides of said unit for connection with the other end portion of said supporting unit in a manner affording said pivotal movement of said transverse member, a pair of supporting legs fixed to said transverse member in laterally spaced relation to the pivot mounting for said member, said supporting legs being vertically extensible to raise the adjacent end of said supporting unit from the ground, a boom pivotally mounted on an intermediate portion of said frame structure, a cable extending from said winch over the free end portion of said boom, a hydraulic ram disposed between said boom and a portion of said frame adjacent said supporting legs, and means connecting said ram with said source of pressure for operation of said ram to vertically move said boom relative to said frame structure, said means including a pressure relief valve operable to provide a slow downward movement of said boom when the later is subjected to an overload.

2. In a hoisting device including a mobile supporting unit, a power driven winch on the supporting unit, a boom mounted on a frame structure carried by the supporting unit, and a cable extending from the winch over the free end portion of the boom, means for relieving the supporting unit of a portion of the load imposed on the boom comprising, a pair of leg members fixed to the frame structure in equally spaced, lateral relation to the boom, each of said leg members comprising a vertical tubular section fixed to the frame structure and an elongated section slidably received by said tubular section and projecting from opposite end portions thereof, and means for adjustably positioning said elongated leg sections relative to their respective tubular sections comprising a pulley fixed to the top end of each of said elongated leg sections, a second pair of pulleys secured to the frame structure inwardly of said leg members and in general transverse alignment therewith, said second pair of pulleys being equally spaced inwardly of said leg members and disposed below the level of the first mentioned pulleys, a cable fixed at its opposite ends to said tubular leg sections and passing over said first mentioned pulleys and under said second pair of pulleys, means connecting the winch driven cable with a midportion of said cable which is connected to said leg sections whereby operation of the winch causes said elongated leg sections to move downwardly relative to the frame structure, and means including a series of pairs of aligned openings through each of said elongated leg sections and a pin insertable in a selected one of said pairs of openings for maintaining said leg members in extended position.

3. In a tractor mounted hoisting device including a U-shaped boom-supporting frame structure disposed in embracing relation to the forward end of the tractor and extending rearwardly along opposite sides thereof for pivotal connection with the tractor adjacent the rear axle thereof, an improved means for detachably securing the forward end of the frame structure to the tractor comprising, a forwardly extending generally horizontal plate member fixed to the forward end of the tractor, a second plate member fixed to a transverse forward portion of the frame structure in generally parallel, spaced relation to said first mentioned plate, detachable connecting means affording pivotal movement between the forward portion of the frame and the tractor along the longitudinal axis of the frame, and yieldable means interposed between said first and second plate members in equally spaced, lateral relation to said pivot means, whereby said frame structure may swing relative to the tractor about the longitudinal axis of said frame.

4. A tractor mounted implement comprising a first frame member adapted to extend transversely of the forward end of the tractor, a pair of additional frame members extending rearwardly from said transverse member in laterally spaced relation to each other, means for pivotally securing the free end portion of said additional frame members to a rearward portion of the tractor in a manner affording lost motion therebetween, and additional means for securing the midportion of said first frame member to the tractor, said additional means comprising a generally horizontal bearing plate fixed to the midportion of said transverse frame member, a bracket adapted to be secured to the forward end of the tractor, means affording a pivotal connection between said transverse frame member and said bracket along the longitudinal axis of said frame, a forwardly extending generally horizontal bearing plate fixed to said bracket in vertically spaced relation to said horizontal bearing plate on said transverse frame member, and means interposed between said horizontal bearing plates yieldingly opposing relative movement between said frame and said bracket about said pivotal connection.

5. A tractor mounted implement comprising a first frame member adapted to extend transversely of the forward end of a wheeled tractor, and a pair of side frame members fixed to said first frame member in spaced relation to each other in position for extending along opposite sides of the tractor, means for pivotally securing the free end portions of said side frame members to the rear axle structure of the tractor in a manner affording lost motion therebetween, and additional means for securing the midportion of said first frame member to the tractor for swinging movement about the longitudinal axis of said frame, said additional means comprising a first bracket fixed to said transverse frame member and having a generally horizontal bearing plate extending rearwardly therefrom, a second bracket adapted for rigid attachment with the forward end of the tractor and having a generally horizontal bearing plate extending forwardly therefrom, means for pivotally securing said brackets together for relative rotation about an axis lying in a vertical plane midway between said side frame members, said horizontal bearing plates being thereby disposed in vertically spaced relation, and biasing means interposed between said horizontal bearing plates for yieldingly resisting said relative rotation of the brackets about their pivotal connection.

References Cited in the file of this patent

UNITED STATES PATENTS

| | | |
|---|---|---|
| 1,873,433 | Larsen | Aug. 23, 1932 |
| 2,128,712 | Neff | Aug. 30, 1938 |
| 2,131,479 | McGiffert et al. | Sept. 27, 1938 |
| 2,190,452 | Kerber | Feb. 13, 1940 |
| 2,238,346 | Sorensen | Apr. 15, 1941 |
| 2,258,383 | Haniquet | Oct. 7, 1941 |
| 2,362,220 | Shoemaker | Nov. 7, 1944 |
| 2,363,341 | Lawler | Nov. 21, 1944 |
| 2,365,167 | Billings | Dec. 19, 1944 |
| 2,598,517 | Drott | May 27, 1952 |
| 2,682,715 | Walby | July 6, 1954 |